United States Patent

[11] 3,623,588

[72] Inventor Ronald Thomas Prodan
Rowayton, Conn.

[21] Appl. No. 812,204

[22] Filed Apr. 1, 1969

[45] Patented Nov. 30, 1971

[73] Assignee The Bunker-Ramo Corporation
Canoga Park, Calif.

[54] ELECTRONIC KEYBOARD WITH UPPER- AND LOWER-CASE CAPABILITY
6 Claims, 3 Drawing Figs.

[52] U.S. Cl. .......... 197/71, 178/17

[51] Int. Cl. .......... B41j 25/24

[50] Field of Search .......... 197/1, 16, 19, 20, 71, 72, 98, 99; 178/4.1, 17, 17.5, 74, 75, 79, 80, 81

[56] References Cited

UNITED STATES PATENTS

| | | | |
|---|---|---|---|
| 1,928,421 | 9/1933 | Griffith | 178/17 |
| 1,974,307 | 9/1934 | Griffith | 178/17 |
| 2,859,276 | 11/1958 | Saykay | 178/17 |
| 2,902,092 | 9/1959 | Hildebrandt | 197/98 UX |
| 2,972,015 | 2/1961 | Saykay | 178/17 |
| 3,273,684 | 9/1966 | Oshiba et al. | 197/16 UX |
| 3,283,873 | 11/1966 | Robinson | 197/71 |
| 3,363,737 | 1/1968 | Wada et al. | 197/98 |
| 3,412,204 | 11/1968 | Hennig et al. | 178/17 |
| 3,441,671 | 4/1969 | Hennig | 178/17 |

*Primary Examiner*—Ernest T. Wright, Jr.
*Attorney*—Frederick M. Arbuckle

ABSTRACT: An electronic keyboard with upper- and lower-case capability which utilizes the same decode circuit for both cases. The shift operation is accomplished by the modification of a single bit from the decoder output. The shift operation may be inhibited under selected conditions, such as when a nonalphabetic key is depressed while the keyboard is in a shift-lock condition. The keyboard may also be switched from a state where it normally generates upper-case characters to a state where it normally generates lower-case characters and the code output from the keyboard may be easily altered.

Figure 1A:
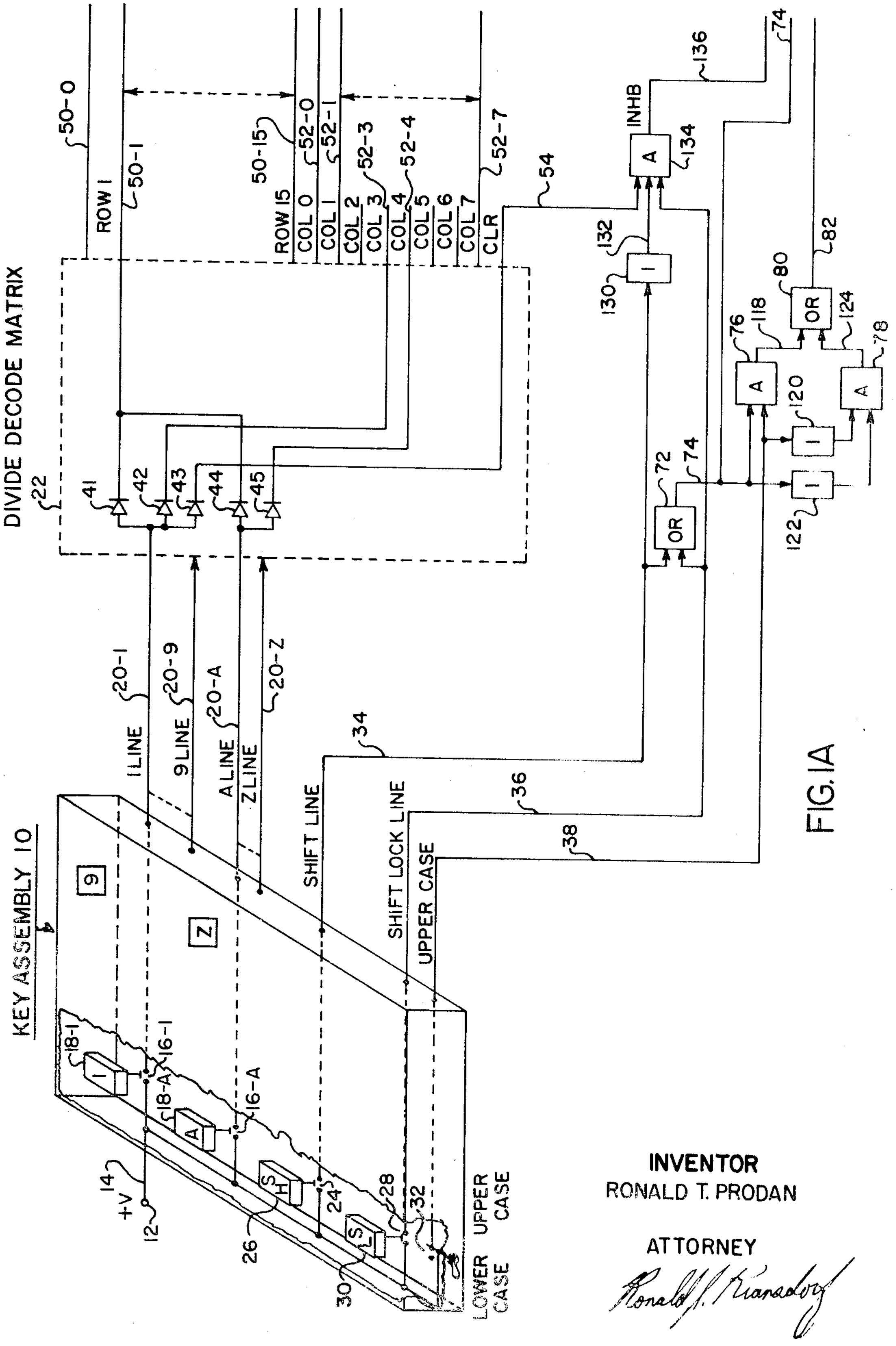

INVENTOR
RONALD T. PRODAN

ATTORNEY
Ronald J. Kransdorf

| B7 B6 B5 → | | | | | 0 0 0 | 0 0 1 | 0 1 0 | 0 1 1 | 1 0 0 | 1 0 1 | 1 1 0 | 1 1 1 |
|---|---|---|---|---|---|---|---|---|---|---|---|---|
| B4 | B3 | B2 | B1 | COL → / ROW ↓ | 0 | 1 | 2 | 3 | 4 | 5 | 6 | 7 |
| 0 | 0 | 0 | 0 | 0 | | | SPACE † | Ø | @ | P | \ † | p † |
| 0 | 0 | 0 | 1 | 1 | | | ! † | 1 | A | Q | a † | q † |
| 0 | 0 | 1 | 0 | 2 | | | " † | 2 | B | R | b † | r † |
| 0 | 0 | 1 | 1 | 3 | | | # † | 3 | C | S | c † | s † |
| 0 | 1 | 0 | 0 | 4 | | | $ † | 4 | D | T | d † | t † |
| 0 | 1 | 0 | 1 | 5 | | | % † | 5 | E | U | e † | u † |
| 0 | 1 | 1 | 0 | 6 | | | & † | 6 | F | V | f † | v † |
| 0 | 1 | 1 | 1 | 7 | | | ' † | 7 | G | W | g † | w † |
| 1 | 0 | 0 | 0 | 8 | | | ( † | 8 | H | X | h † | x † |
| 1 | 0 | 0 | 1 | 9 | | | ) † | 9 | I | Y | i † | y † |
| 1 | 0 | 1 | 0 | 10 | | | * † | : | J | Z | j † | z † |
| 1 | 0 | 1 | 1 | 11 | | | + † | ; | K | | k † | { |
| 1 | 1 | 0 | 0 | 12 | | | , | < † | L | | l † | \| |
| 1 | 1 | 0 | 1 | 13 | | | — | = † | M | | m † | } |
| 1 | 1 | 1 | 0 | 14 | | | . | > † | N | | n † | ~ |
| 1 | 1 | 1 | 1 | 15 | | | / | ? † | O | | o † | DELETE |

FIG. 2

ELECTRONIC KEYBOARD WITH UPPER- AND LOWER-CASE CAPABILITY

This invention relates to electronic keyboards, and more particularly to an electronic keyboard which may have the output code for a given key altered in a predetermined fashion by the simultaneous depression of a second key.

Existing keyboards are either completely mechanical, such as the keyboards utilized in a normal manual typewriter, electromechanical, with a key depression being mechanically coded to generate an electrical output, or completely electronic. The first two types of keyboards indicated above suffer from the problems inherent in any mechanical linkage. These include a tendency to go out of adjustment as a result of wear, dirt and other contaminants in the environment, and/or other factors. The inertia of mechanically moving parts also tends to limit the speed of these keyboards while the complexity of mechanical assembly tends to prevent the coding of the keyboard from being easily altered. The wear and adjustment problem also increases the maintenance costs of these keyboards and substantially reduces their useful life. The complexity of assembly tends to increase the initial cost.

It is thus apparent that, as compared with mechanical and electromechanical keyboards, a fully electronic keyboard is faster, simpler, less expensive to build and maintain, more reliable, more versatile, and usable under a greater variety of environmental conditions (electronic components may be hermetically sealed). However, existing electronic keyboards have been special purpose devices with, for example, only a numeric keyboard or only an alphabetic keyboard. A need, therefore, appears to exist for a fully electronic, general purpose keyboard wit full alphanumeric and special character capability as well as upper and lowercase capability. Such a keyboard could be utilized to permit communication between a computer and people attempting to work therewith. Such people might be located at the computer side in which event the output from the keyboard would be applied directly to control the operation of the computer; or they could be located at remote locations in which event the keyboard output would be transmitted in coded form. The code most generally utilized in these applications is the United States of America Signal Code for Information Interchange (ASCII). The output from the keyboard might also be utilized to control a cathode-ray tube (CRT) display device at the remote location or to control a printer.

An electronic keyboard of this type could also be designed with features not hereto available on either mechanical or electromechanical keyboards. For example, existing keyboards generally develop lowercase characters when a shift key is not depressed and generate uppercase characters when a shift key is depressed. However, in some applications, as where the keyboard is being used in conjunction with a CRT, it may be desired to normally generate uppercase codes, and to generate lowercase codes when a shift key is depressed. It is therefore desirable to provide the keyboard with the capability of generating either uppercase or lowercase characters when in an unshifted mode, and with the ability to easily change from one case to the other. Also, the shift-lock key is generally depressed when a number of successive characters in the case which is generated when the keyboard is in its shifted state are desired. In existing keyboards, when the shift-lock key is depressed, a special character associated with a numeric key is obtained when a numeric key is depressed and, if a numeral is desired, the shift-lock key must be released. In some applications it may be desirable to provide that only alphabetic characters will have their case changed when the shift-lock key is depressed. Further, existing circuits for generating upper and lower case, utilize a separate decode circuit for each. A substantial saving in hardware would, of course, be possible if this duplication of element could be avoided.

It is therefore a primary object of this invention to provide an improved electronic keyboard.

A more specific object of this invention is to provide an electronic keyboard with upper and lowercase capability. upper and A still more specific object of this invention is to provide an electronic keyboard which is capable of generating the complete ASCII code set including both upper and lowercase characters.

Another object of this invention is to provide an electronic keyboard of a type indicated above which shifts only alpha characters when the shift lock key is depressed.

Still another object of this invention is to provide an electronic keyboard of the type indicated above which permits the case in which characters are generated when the keyboard is in its unshifted mode to be selected and controlled.

A further object of this invention is to provide an electronic keyboard with upper and lowercase capability which requires only a single-decode circuit.

In accordance with the above objects this invention provides a key board which operates in response to the depression of one or more keys representing a selected character for generating an electrical output representing the character in a predetermined permutational code. For the preferred embodiment of the invention, this code is ASCII. The keyboard has a first type of keys which are, for example, shift keys. A first character code in the permutational code is generated in response to the depression of a key of the first type but, said first character code is altered in a predetermined way so as to obtain a second character code if a key of the second type is depressed simultaneously with the key of the first type. Thus, for example, the character code for a particular character is a first case is generated when the key for the character is depressed, and this code is altered to obtain the code for the character in the other case of the shift key is depressed simultaneously with the depressing of the character key.

The foregoing and other objects, features and advantages of the invention will be apparent from the following more particular description of a preferred embodiment of the invention as illustrated in the accompanying drawing.

Figure 1B:
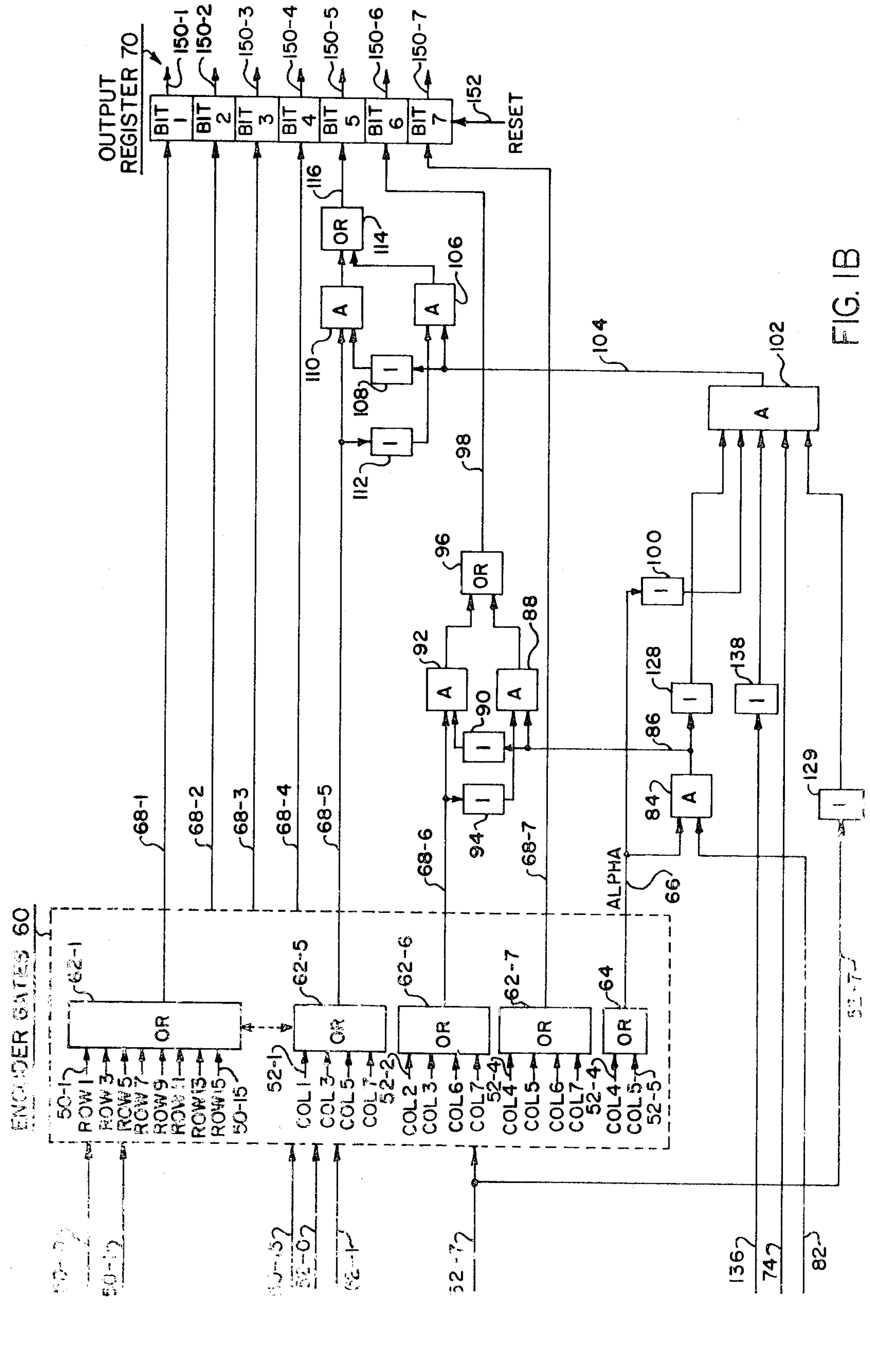

In the drawing:

FIGS. 1A—1B, when combined, form a schematic block the keyboard a preferred embodiment of the invention.

FIG. 2 is a charge illustrating the coding for keyboard KEYBOARD characters.

Referring to FIG. 1A, it is seen that the keyboard includes, as a first element, a key assembly 10. This assembly 10 is shown partially broken away to illustrate the switch structure for a few exemplary keys. The arrangement of the keys has been selected for ease of illustration, and bears no relation to the relative positions which the keys might occupy on a practical keyboard.

From FIG. 1A it is seen that a positive voltage from terminal 12 is applied through line 14 to one terminal to a switch 16 for each alpha numeric character key. The depression of a key 18 closes the corresponding switch 16 permitting the positive voltage from terminal 12 to be applied through the corresponding line 20 to diode decode matrix 22. The positive potential on line 14 is also applied to one terminal of switch 24 associated with shift key 26, to one terminal of switch 28 associated with shift-lock key 30, and to the transfer arm of uppercase/lowercase switch 32. The depressing of shift key 26 thus results in a positive potential on shift line 34, while the depressing of shift-lock key 30 results in a positive potential on shift-lock line 36. All the keys of key assembly 10 are momentary make keys except shift-lock key 30 which is a press-to-make and a press-to-release key. The key switches of assembly 10 have been shown schematically in FIG. 1A, and it is to be understood that any key switches capable of performing the desired functions may be utilized.

Switch 32 permits the operator to select whether uppercase or lowercase characters will be generated by the keyboard when a shift signal does not appear on line 34 or line 36. When switch 32 is set for upper case, a positive signal appears on line 38. When switch 32 is set for lowercase there is no signal on line 38. The manner in which the signal on line 38 is utilized will be discussed shortly.

Lines 20–1 to 20–9 and 20–A to 20–Z from key assembly 10 are applied as inputs to diode decode matrix 22. In addition, lines representing various special characters such as punctuation marks, space, or delete, may also be applied to the decode matrix 22. Referring to FIG. 2, it is sees that each character in ASCII code occupies a unique row and column position in a character matrix. The first four bits of the seven bit ASCII code for a character are utilized to designate the row position of the character, while the last three bits designate the column position. Thus, the uppercase character "A" is in row 1, column 4, while the lowercase character "*a*" is in row 1 column 6. It is further seen that, for each uppercase character in column 4, there is a corresponding lowercase character in column 6, while for each uppercase character in column 5, there is a corresponding lowercase character in column 7.

Referring again to FIG. 1A, diode decode matrix 22 is effective to convert the character signals on lines 20 into signals representing the row and column position for each character. Thus, a signal on line 20–1 is applied through a diode 41 to row line 50–1, and through a diode 42 to column line 52–3. This indicates that the numeral 1 is in row 1, column 3, which, as may be seen from FIG. 2, is in fact the case. The signal on line 20–1 is also applied through diode 43 to CLR line 54. A signal on line 54 indicates that the character being decoded is not an alphabetic character. In other words a signal will appear on line 54 when the character being decoded in matrix 22 in a numeric character, a punctuation character, or a special character such as those which appear in columns 2, 3 and 7 of FIG. 2. The manner in which a signal on line 54 is utilized will be described shortly. The signal on line 20A is applied through diode 44 to row line 50–1, and through diode 45 to column line 52–4. Again, referring to FIG. 2 it is seen that the upper case A is positioned at the intersection of row 1 and column 4. Thus, the depression of the A key on key assembly 10 will cause the row and column position for an upper case A to be generated in matrix 22.

FIG. 2 may be utilized to determine the row and column outputs from matrix 22 for each character. Regardless of whether switch 32 is in its uppercase or lowercase position, and regardless of whether shift key 26 or shift-lock key 30 is depressed, matrix 22 will always generate the code outputs for the characters which do not have the symbol † adjacent to them. Thus, matrix 22 will always generate the uppercase codes of columns 4 and 5 when an alphabetic character key is depressed, with circuitry to be described shortly causing this code to be altered or a lowercase code from column 6 or 7 if such is desired. Similarly, matrix 22 will always generate the numeric and special characters in column 3 for rows 0 through 11, and the special characters in column 2 for rows 12 through 15 when the keys representing these characters are depressed. Again circuitry to be described shortly will assure that the desired character is obtained at the output. Since there are no corresponding characters in the rows 11–15 of column 5 for the characters appearing in rows 11–15 of column 7, special keys must be provided for these characters. Circuitry to be described shortly will prevent these characters from being altered as a result of a shift or shift-lock key depression.

Row output line 50–0 through 50–15 and column output line 52–0 through 52–7 from diode decode matrix 22 are applied as the inputs to encoder gates 60. There is an OR-gate 62 in gating circuit 60 for each of the seven bits of the ASCII character. The inputs to each of the OR-gates 62 may be determined by referring to FIG. 2. Looking at the left side of FIG. 2, it is seen that there is a B1 bit for each odd numbered row. Thus, the odd numbered row lines 50–1, 50–3, 50–5, . . . 50–13 and 50–15 are connected as the inputs to OR-gate 62–1. The lines 50–0 to 50–15 which are to be connected to OR-gates 62–2 to 62–4 (not shown) may be similarly determined from FIG. 2.

Looking now at the top of FIG. 2, it is seen that there is a bit 5 for each odd numbered column. Thus, the odd numbered column lines 52–1, 52–3, 52–7 are connected at the inputs to OR-gate 62–5. It should be noted that, since columns 0 and 1 in the ASCII code are reserved for communications control codes, line 52–1 may be eliminated as an input to OR-gate 62–5 if desired. Referring still to the top of FIG. 2, it is seen that the column lines 52–2, 52–3, 52–6 and 52–7 are the proper inputs for bit-6 OR-gate while column lines 52–4, 52–5, 52–6 and 52–7 are the proper inputs to bit-7 OR gate 62–7. Since, as was indicated previously, the decode matrix 22 generates an output on column 4, line 52–4 or column 5, line 52–5 when an alphabet character has been applied to it, these two column lines are applied as inputs to OR-gate 64. An output from OR-gate 64 on ALPHA line 66 is utilized to indicate that an alphabetic character has been decoded.

Since the tow designating bits B1–B4 on an ASCII coded character are the same regardless of whether an uppercase or a lowercase character is to be generated, output lines 68–1 through 68–4 from OR-gates 62–1 through 62–4 are applied directly as inputs to the corresponding bit positions in output register 70. Similarly, bit 7 does not undergo any change as a result of a case shift. Therefore, output line 68–7 from OR-gate 62–7 may also be applied directly as an input to the corresponding bit position in output register 70.

The circuitry for controlling bits 5 an 6 is, however, more complicated. Assume first that the circuit is in the upper case mode, as shown so that here is a positive signal on line 38, that the alphabetic key 18–A has been depressed, and that, neither of the shift keys (26–30) has been depressed. Under these conditions, an upper case A is desired. Referring to FIG. 2 it is seen that, since an upper case A is in column 4, bits 5 an 6 should both be zeros. Since column 4 is not an input to either OR-gate 62–5 or OR-gate 62–6, there will be no signal on line 68–5 or line 68–6. There will be a positive signal on line 38 but no signal on either line 34 or 36. Since lines 34 and 36 are the inputs to OR-gate 72, there will be no signal on output line 74 from this OR-gate 72. Since AND-gate 76 is fully conditioned only when signals appear on both line 38 and line 74, while AND-gate 78 is fully conditioned only when a signal appears on neither of these lines (38, 74) neither AND-gate 76 nor AND-gate 78 will be fully conditioned under the conditions indicated above. Thus, neither input to OR-gate 80 will be present and a signal will not appear on line 82.

Line 82 is connected as one input to AND-gate 84, the other input to this AND-gate 84 being the before-mentioned ALPHA line 66. Since one the the inputs to AND-gate 84 is missing under conditions indicated above, there will be no signal output line 86 from AND-gate 84. Line 86 is connected as one input to AND-gate 88 and through inverter 90 as one input to AND-gate 92. Line 68–6 is connected as one input to AND-gate 92 and through inverter 94 as the second input to AND-gate 88. Since there is a signal on neither line 68–6 nor line 86 a this time, neither AND-gate 88 not AND-gate will be fully conditioned. OR-gate 96 will thus not generate an output on line 98. The absence of a signal on line 98 will cause the desired zero to be recorded in the bit 6 position of output register 70.

Since there is a signal on ALPHA line 66 at this time, inverter 100 will not be applying an input to AND-gate 102. Output line 104 from AND-gate 102 will thus not have a signal on it at these time. Line 104 is connected as one input to AND-gate 106 and through inverter 108 as one input to AND-gate 110. Line 68–5 is connected as the other input to AND-gate 110 and through inverter 112 as the other input to AND-gate 106. Thus, since there is a signal on neither line 68–5 nor line 104 under the conditions indicated above, neither AND-gate 106 nor AND-gate 110 will be fully conditioned at this time. Since neither AND-gate 106 nor AND-gate 110 is supplying an input to OR-gate 114, output line 116 from OR-gate 114 stores a zero in the bit 5 position of output register 70. The desired column 4 code is thus obtained in the bit 5 and bit 6 positions.

As will become more apparent later, the lines 86 and 104 are the shift-bit-6 and shift-bit-5 lines respectively. Thus, a shifted character (a character having a† next to it in FIG. 2) can be obtained only when a signal appears on the appropriate one of these lines (86 and 104).

Assuming the same conditions as above except that the key for the letter Q rather than the key for the letter A is depressed, it is seen that no change occurs in the generation of the bit 6 character and this character, therefore, remains a zero. However, as may be seen from FIG. 2, the character being generated is now in column 5 and an output bit is therefore required in the bit 5 position. Since column 5 line 52–5 is an input to OR-gate 62–5, a signal now appears on line 68–5. However, the signal on line 52–5 is also applied through OR-gate 64 to ALPHA line 66, thus inhibiting a signal from appearing on line 104. Inverter 108 is, therefore, applying a signal to one input of AND-gate 110 while OR-gate 62–5 is applying a second input to this AND-gate 110. AND-gate 110 is thus fully conditioned to generate an output which is applied through OR-gate 11 4 and line 116 to store the desired bit in the bit 5 position of output register 70.

The storing of a character in the bit 5 position will be the same regardless of whether a shift operation is being performed or not. Therefore, the discussion to follow with respect to the generating of alphabetic codes will be with respect to bit 6 only.

Assume now than an alphabetic key has been struck, that switch 32 is set for uppercase operation, and that shift key 26 or shift-lock key 30 is depressed. Under these conditions, signals will appear on both line 38 and line 74 fully conditioning AND-gate 76. The resulting output signal on line 118 is applied through OR-gate 80 and line 82 to fully condition AND-gate 84 to generate an output signal on line 86. Since neither line 52–4 nor line 52–5 (the column 4 and column 5 lines) is connected as an input to OR-gate 62–6 there will not be a signal on lines 68–6 for any alphabetic character. Therefore, for any alphabetic character, inverter 94 is applying a signal to one input of AND-gate 88. AND-gate 88 is thus fully conditioned to generate an output which is applied through OR-gate 96 and line 98 to store a bit in the bit 6 position of output register 70. From FIG. 2 it can be seen that the storing of a bit in the bit 6 position results in a shift from column 4 to column 6 or from column 5 to column 7. Since the characters in columns 6 and 7 are the lowercase versions of the characters occupying the corresponding row positions in columns 4 and 5 respectively, the depressing of the shift or the shift-lock key (26 or 30) has resulted in the output being changed from an uppercase to a lowercase character. It should be noted that for an alphabetic character, the operation is the same whether the shift-lock key 26 or the shift-lock key 30 is depressed. As will be seen shortly, this is not true for the nonalphabetic characters.

Assume now that switch 32 is transferred to the lowercase position, so that a signal no longer appears on line 38, and that neither the shift nor the shift-lock key (26,30) is depressed, so that OR-gate 72 is not generating an output on line 74. Under these conditions inverters 120 an 122 are effective to generate outputs which fully conditions AND-gate 78 to apply a signal through line 124, OR-gate 80, and line 82 to one input of AND-gate 84. Since an ALPHA character is still being generated, AND-gate 84 is fully conditioned to generate an output signal on line 86. Both inputs to AND-gate 88 are thus present causing a signal to be applied through OR-gate 96 and line 98 to store a bit in the bit-6 position of output register 70. The desired lowercase character is in this manner achieved. It is thus seen that a lowercase character may be obtained either by depressing the shift or shift-lock key (26 or 30) when the circuit is set for uppercase operation, or by setting the circuit for lowercase operation and not depressing either of the shift keys (26,30).

The final situation which may occur with an alphabetic key occurs when switch 32 is set for lowercase operation and one of the shift keys (26,30) is depressed. Under these conditions there is a signal on line 74 but no signal on line 38. Thus, neither AND-gate 76 nor 78 is fully conditioned. This results in the absence of a signal on line 82 deconditioning AND-gate 84 so as to prevent the appearance of a signal on line 86. Since neither line 68–6 nor line 86 has a signal on it, neither AND-gate 88 nor AND-gate 92 is fully conditioned, and, as indicated previously this results in a zero bit being stored in the bit 6 position of output register 70. The desired uppercase character is in this manner generated and stored.

Referring again to FIG. 2 it is seen that for the nonalphabetic characters assigned to columns 2, 3 and 7, bit 6 is always a one. As a result, OR-gate 62–6 will always be generating an output on line 68–6 when a key for one of these characters is depressed. However, since neither of the inputs to OR-gate 64 are present when a key for one of these characters is being depressed, there will be no signal on ALPHA line 66 and AND-gate 84 will thus be deconditioned. The signal on line 68–6 is applied as one input to AND-gate 92 and, since there is no signal on line 86, inverter 90 generates a signal which fully conditions AND-gate 92 to generate an output which is applied through OR-gate 96 and line 98 to store a bit in the bit-6 position of output register 70. It is thus seen that the desired bit is stored in the bit 6 position of output register 70 for a nonalphabetic character regardless of the shift state of the keyboard and the setting of switch 32. No mention will, therefore, be made of bit 6 in the discussion to follow. It should also be noted that since switch 32 is only utilized to control the setting of bit 6, this switch 32 will likewise play no further part in the discussion to follow.

Assume now that a key for a nonalphabetic character, such as for example, key 18–1, has been depressed, but that neither of the shift keys (26,30) has been depressed. Referring to FIG. 2, it is seen that under these conditions, bit 5 should be a 1. The signal on line 20–1 from assembly 10 causes decode matrix 22 to generate output signals on, among other lines, column lines 52–3 and CLR line 54. Line 52–3 is connected as one input to OR-gate 62–5 resulting in a signal appearing on line 68–5. This signal is applied as one input to AND-gate 110. Since neither of the shift keys (26,30) are depressed, OR-gate 72 is no generating an output on line 74 at this time. Since line 74 is one of the inputs to AND-gate 102, AND-gate 102 is deconditioned. The absence of a signal on output line 104 from AND-gate 102 permits inverter 108 to fully condition AND-gate 110. This results in a signal being applied through OR-gate 114 and line 116 to store the desired bit in a bit-5 position of output register 70.

If the shift key 26 is now depressed, a signal appears on line 36 which is applied through OR-gate 72 and line 74 to one input of AND-gate 102. Since there is no signal on ALPHA line 66 at this time, inverter 100 is applying a second input to AND-gate 102. The absence of a signal on line 66 also deconditions AND-gate 84, permitting inverter 128 to apply a third input to AND-gate 102. Since the selected character is not from column 7, there is no signal on line 52–7 from decode matrix 22 and inverter 129 therefore applies a fourth input to AND-gate 102. The signal on shift line 34 is applied as the input to inverter 130. The presence of signal on line 34 prevents inverter 130 from generating an output signal on line 132 and thus deconditions AND-gate 134. The absence of a signal on INHB output line 136 from AND-gate 134 permits inverter 138 to fully condition AND-gate 102 to generate an output on line 104. Since signals are now simultaneously appearing on lines 68–5 and 104, neither AND-gate 106 nor 110 is fully conditioned and OR-gate 114 can therefore not apply a signal to line 116. The depressing of shift key 26 thus results in bit 5 being altered from a one to a zero. As may be seen from FIG. 2, this results in a shift from column 3 to column 2. Thus, if key 18–1 had originally been struck, the code for an exclamation point would be stored in output register 70 rather than the code for the numeral 1.

Assume now that the shift-lock key 30 rather than the shift key 26 is depressed. Under these conditions, there is a signal on shift-lock line 36 which is applied as one input to AND-gate 134. There is also a signal on CLR line 54 which is applied as a second input to AND-gate 134 and, since there is no signal on shift line 34, inverter 130 applies a signal through line 132 to fully condition AND-gate 134. The resulting signal on INHB line 136 prevents inverter 138 from generating an output signal to fully condition AND-gate 102. This results in the absence of a signal on line 104 which permits inverter 108 to fully condition AND-gate 110 resulting in a bit being stored in the bit-5 position of output register 70. Thus, the shift-lock key 30 is inhibited from causing an alteration of the code stored for a nonalphabetic character.

If, with shift-lock key 30 depressed, shift key 26 is also depressed at the same time that a key for a nonalphabetic character is depressed, inverter 130 is prevented from generating an output on line 132 and AND-gate 134 is thus deconditioned. This results in inverter 138 generating an output to fully condition AND-gate 102. The desired shift from column 3 to column 2 is thus effected.

As was indicated previously, no change in code is desired when a key for one of the special characters in column 7 is depressed. Since column 7 is not one of the inputs to OR-gate 64, a signal does not appear on ALPHA line 66 and, as indicated previously this prevents any change in column 6 regardless of the depression of the shift keys (26,30). Since, for a column 7 special character, there is a signal on column 7 line 52–7, invertor 129 is not generating an output and AND-gate 102 is thus not conditioned to generate a signal on line 104. Again, as indicated previously, there can be no change in the state of bit 5 unless a signal appears on line 104. Thus, the special characters in column 7 are not changed when the shift or shift-lock key (26 or 30) is depressed.

In the discussion above it was assumed that bit 5 was a one for the character in its unshifted condition and a zero for the character in its shifted condition. However, as may be seen from FIG. 2, for characters in rows 12, 13, 14 and 15 of column 2 the reverse is true. When one of these character keys is depressed, decode matrix 22 generates an output on column 2, line 52–2. Since line 52–2 is not one of the inputs to OR-gate 62–5, no signal appears on line 68–5 and inverter 112 therefore applies a signal to one input of AND-gate 106. However, when neither of the shift keys (26,30) are depressed, there is no signal on line 74 and AND-gate 102 is thus deconditioned. This results in the absence of a signal on line 104 which prevents AND-gate 106 from being fully conditioned. The desired zero bit is thus stored in the bit-5 position of output register 70. When the shift key 26 is depressed, AND-gate 106 is fully conditioned to cause a bit to be stored in the bit-5 position of the output register 70 thus giving the desired shift from column 2 to column 3.

The bits in output register 70 may be applied through lines 150 to control a print operation, to control the display of a character on a CRT, to transmit the character through a line to a remote point, or for any other desired purpose. When the character in the register 70 has been utilized, the utilization circuit applies a signal to line 152 to reset the register 70 in preparation for receipt of the next character.

From the above it may be seen that the coding for the keyboard may be easily altered by either changing diode decode matrix 22, encoder gates 60 or both. With modern solid-state technology, such a change can generally be effected by changing a single printed circuit card. If desired, the change from uppercase to lowercase operation may also be effected in this way rather than by use of switch 32. Switch 32 might also be replaced by a plug-wire on, for example, the rear of the keyboard.

Thus, an extremely versatile keyboard has been provided which can easily shift from uppercase to lowercase operation, can permit the inhibiting of the shift under selected conditions, and can simply and economically accommodate varying code structures. It is of course apparent that, while the invention has been particularly shown and described with reference to a preferred embodiment thereof, various changes in form and detail may be made therein by those skilled in the art without departing from the spirit and scope of the invention.

What is claimed is:

1. A keyboard of the type which is operative in response to the depression of a key or keys representing a selected character for generating electrical outputs representing said characters in a predetermined multibit code, each character which may be generated by said keyboard being designatable by its row and column position in a code matrix, comprising:

a first type of keys on said keyboard and a second type of keys on said keyboard;

means responsive to the depression of a key of said first type for electronically generating signals representing the row position and column position for the character represented by the key;

means responsive to said row and column position signals for electronically generating first character code in said multibit code;

means responsive to the depression of a key of said second type and said key of said first type for altering said first character code by changing a single bit thereof to obtain a second character code;

means for detecting the column for the character normally generated in response to the depression of a key of said first type; and means included as part of said means for altering the first character code and responsive to said column detection for controlling the bit in said first character code which is altered in order to obtain said second character code.

2. A keyboard of the type described in claim 1 wherein said second type keys include a shift key, and a shift-lock key;

wherein the column position for alphabetic characters is different from the column position for nonalphabetic characters; and including means responsive to the depression of only said shift-lock key of said keys of said second type and to the detection of a column position for a nonalphabetic character for inhibiting the altering of the state of a bit in said first character code.

3. A keyboard of the type described in claim 1 wherein there are two keys of said second type, a shift key and a shift-lock key; and including means operative when a key from a selected group of keys of said first type and the shift-lock key are simultaneously depressed for inhibiting the altering of said first character code.

4. A keyboard of the type described in claim 3 wherein said selected group of keys includes all keys of said first type on the keyboard except alphabetic keys.

5. A keyboard of the type described in claim 18 wherein a key of said first type is a character designating key and a key of said second type is a shift key;

including means for selecting whether uppercase or lowercase characters will be obtained from said keyboard when no shift key is depressed; and means responsive to said selecting means for causing character codes of the selected case to be normally generated by said keyboard.

6. A keyboard of the type described in claim 5 wherein said means for causing character codes of the selected case to be generated includes means responsive to the selection of uppercase and to a shift key not being depressed, or to the selection of lowercase and a shift key being depressed, for causing the code for an uppercase character to be generation and means responsive to the selection of uppercase and a shift key being depressed, or to the selection of lowercase and a shift key not being depressed, for causing the character code for a lowercase character to be generated.

* * * * *